(12) United States Patent
Navada

(10) Patent No.: US 7,903,555 B2
(45) Date of Patent: Mar. 8, 2011

(54) PACKET TRACING

(75) Inventor: Muraleedhara Herur Navada, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1062 days.

(21) Appl. No.: 10/740,383

(22) Filed: Dec. 17, 2003

(65) Prior Publication Data

US 2005/0149604 A1   Jul. 7, 2005

(51) Int. Cl.
  *H04J 1/16* (2006.01)
(52) U.S. Cl. .......................... 370/231; 370/392; 370/396
(58) Field of Classification Search .................. 370/389, 370/396, 392, 350, 469, 231; 709/200
See application file for complete search history.

(56) References Cited

U.S. PATENT DOCUMENTS

| | | | | |
|---|---|---|---|---|
| 5,012,947 A * | 5/1991 | Roland | ....................... | 220/573.1 |
| 5,333,320 A * | 7/1994 | Seki | ............................... | 713/100 |
| 5,511,215 A * | 4/1996 | Terasaka et al. | ................ | 712/25 |
| 5,598,410 A * | 1/1997 | Stone | ............................ | 370/469 |
| 5,648,965 A * | 7/1997 | Thadani et al. | ............... | 370/241 |
| 5,678,060 A * | 10/1997 | Yokoyama et al. | ........... | 709/212 |
| 5,781,549 A * | 7/1998 | Dai | ............................... | 370/398 |
| 5,802,065 A * | 9/1998 | Ogawa et al. | ................. | 370/469 |
| 5,848,290 A * | 12/1998 | Yoshida et al. | ................ | 712/26 |
| 6,338,078 B1 * | 1/2002 | Chang et al. | .................. | 718/102 |
| 6,463,067 B1 * | 10/2002 | Hebb et al. | .................... | 370/413 |
| 6,526,500 B1 * | 2/2003 | Yumoto et al. | .................. | 712/25 |
| 6,654,823 B2 * | 11/2003 | Soejima et al. | ................. | 710/52 |
| 6,732,253 B1 * | 5/2004 | Redford | .......................... | 712/22 |
| 6,778,534 B1 * | 8/2004 | Tal et al. | ....................... | 370/392 |
| 6,804,240 B1 * | 10/2004 | Shirakawa et al. | ........... | 370/392 |
| 6,954,789 B2 * | 10/2005 | Dietz et al. | ..................... | 709/224 |
| 6,957,272 B2 * | 10/2005 | Tallegas et al. | ............... | 709/238 |
| 7,075,926 B2 * | 7/2006 | Cathey et al. | .................. | 370/389 |
| 7,164,698 B1 * | 1/2007 | Krishnamurthi et al. | ..... | 370/541 |
| 7,181,742 B2 * | 2/2007 | Hooper | .......................... | 718/100 |
| 7,190,695 B2 * | 3/2007 | Schaub et al. | ................. | 370/392 |
| 7,228,348 B1 * | 6/2007 | Farley et al. | ................... | 709/224 |
| 7,304,999 B2 * | 12/2007 | Sukonik et al. | ................ | 370/396 |
| 7,313,142 B2 * | 12/2007 | Matsuo et al. | ........... | 370/395.32 |
| 7,418,536 B2 * | 8/2008 | Leung et al. | ................... | 710/306 |
| 7,424,019 B1 * | 9/2008 | Kopelman et al. | ............ | 370/392 |
| 7,502,375 B2 * | 3/2009 | Hahn et al. | ..................... | 370/401 |
| 2002/0054594 A1 * | 5/2002 | Hoof et al. | ..................... | 370/389 |
| 2002/0071433 A1 * | 6/2002 | Tsuruoka et al. | ............. | 370/389 |
| 2002/0085560 A1 * | 7/2002 | Cathey et al. | ................. | 370/392 |
| 2002/0120828 A1 * | 8/2002 | Modelski et al. | ............. | 712/200 |
| 2003/0046429 A1 * | 3/2003 | Sonksen | ........................ | 709/246 |
| 2003/0212840 A1 * | 11/2003 | Namba | ............................ | 710/22 |
| 2003/0231634 A1 * | 12/2003 | Henderson et al. | ....... | 370/395.32 |
| 2004/0085906 A1 * | 5/2004 | Ohtani et al. | .................. | 370/248 |
| 2004/0190512 A1 * | 9/2004 | Schultz | ........................... | 370/389 |

* cited by examiner

*Primary Examiner* — Ricky Ngo
*Assistant Examiner* — Dewanda Samuel
(74) *Attorney, Agent, or Firm* — Blakely, Sokoloff, Taylor & Zafman LLP

(57) ABSTRACT

A method of packet tracing includes triggering tracer devices. Each tracer device corresponds to an associated processing stage within a packet processor. The method also includes storing an indication after a packet completes an associated processing stage. The method may further include sending contents of a register to an application.

27 Claims, 4 Drawing Sheets

PACKET TRACING

BACKGROUND

Data networking devices typically include line interfaces, aggregators, queuing engines, a scheduler, packet memory, look-up engines, and a packet processor. The packet processor generally includes modules that perform various processing functions. For example, parsing a packet, classifying a packet, determining Internet Protocol (IP) routing, editing, address look-up, etc. At present, these packet processors operate at very high speeds and are densely pipelined with a throughput of about a packet per clock cycle.

DESCRIPTION

Figure 1:
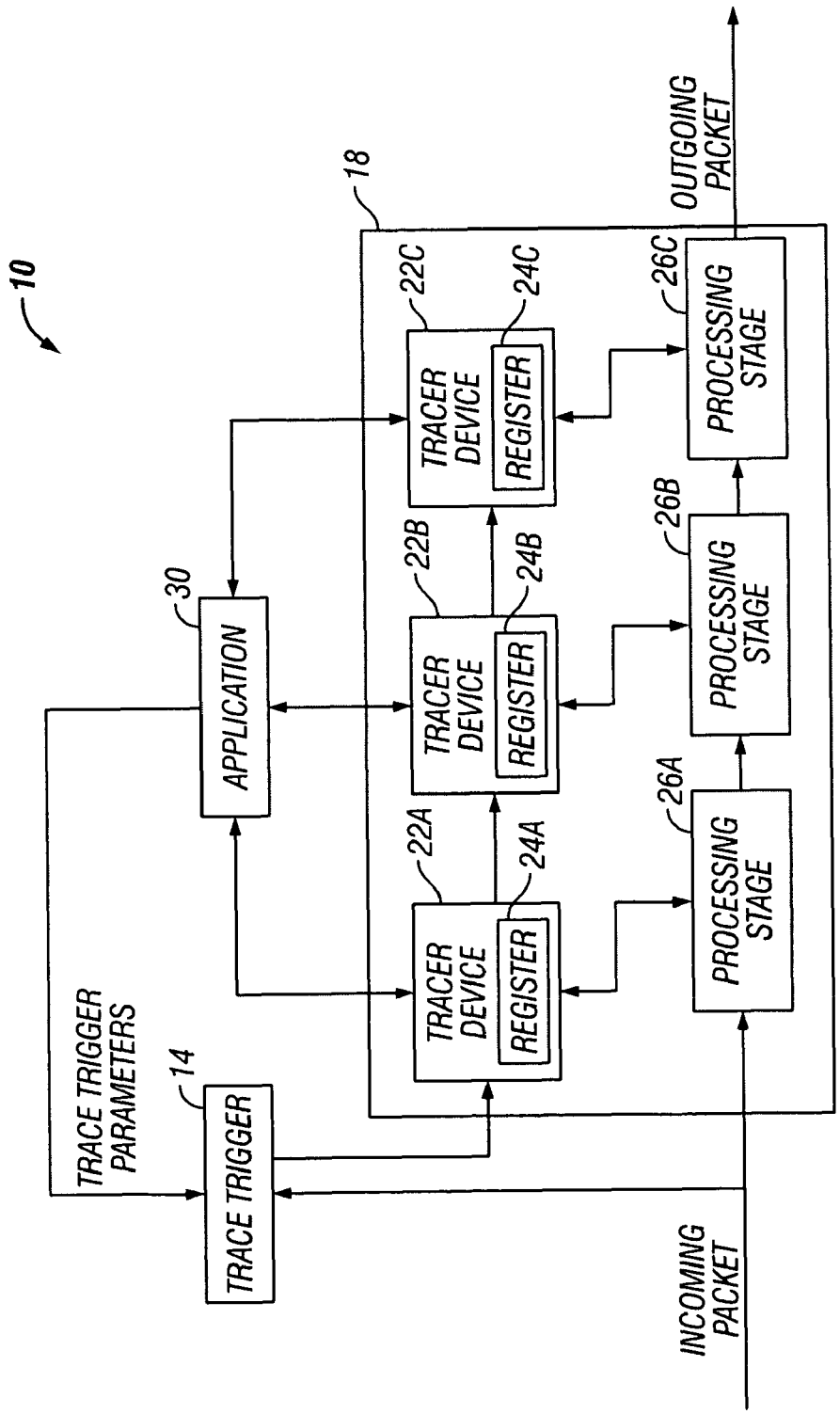
FIG. 1 is a block diagram of a packet tracing system.

Referring to FIG. 1, a packet tracing system 10 includes a trace trigger 14, a packet processor 18 and an application 30. Packet processor 18 includes tracer devices (e.g., tracer device 22a, tracer device 22b and tracer device 22c) and processing stages (e.g., processing stage 26a, processing stage 26b and processing stage 26c). The processing stages 26a-26c may perform various functions including but not limited to parsing a packet, performing address look-up, auto-learning, forwarding port determination, accessing control lists, editing, determining IP routing and the like.

Trace trigger 14 compares incoming packets with a set of trace parameters, and, if appropriate, sends a trigger signal to the tracer devices 22a-22c to monitor the processing stages 26a-26c).

In one example, a trace trigger includes a data control register (not shown), a data comparator (not shown) and a mask register (not shown) to specify the trace parameters. Determining if the trace parameters are in an incoming packet is performed using a masked comparison or masked matching on relevant portions of the incoming packet header for example.

Application 30 may be any application that benefits from packet tracing, for example, a central processing unit, a device driver, a protocol stack, debugging software, a software program and the like. Application 30 provides the trace parameters to the trace trigger to indicate which types of packets to trace.

Each tracer device 22a-22c includes a register (e.g., register 24a, register 24b and register 24c). Each tracer device 22a-22c monitors packets within a corresponding processing stage (e.g., tracer device 22a monitors processing stage 26a, tracer device 22b monitors processing stage 26b, and tracer device 22c monitors processing stage 26c). Monitoring a packet within a processing stage includes determining what processing was done on the packet, how the processing was performed, how the packet was modified during processing and the like. In one example, trace devices 22a-22c are dedicated hardware that collect information when enabled by a trigger signal (e.g., a flag) from the trace trigger 14.

Trace trigger 14 determines if a packet will be traced as the packet passes through each of the processing stages 26a-26c within packet processor 18 and, if it does, sends the trigger signal to the tracer devices 22a-22c to monitor the packet's progress. In one example, the trigger signal is sent to each of the trace devices 22a-22c serially and follows the packet in parallel through each tracer device 22a-22c corresponding to the processing stage 26a-26c where the packet is being processed. In this configuration, each processing stage may be processing a different packet simultaneously and whether a packet is being traced at a particular stage is distinguishable by the tracing signal received at the respective tracer device.

Each tracer device 22a-22c stores within its respective register 24a-24c an indication. The indication may denote one or more of the following: whether the packet has passed through its corresponding processing stage, what processing was performed, how the packet was modified and so forth.

Using system 10, application 30 can monitor designated packets as they pass through the various processing stages within the packet processor 18 by reading the registers 26a-26c within the tracer devices 22a-22c.

Figure 2:
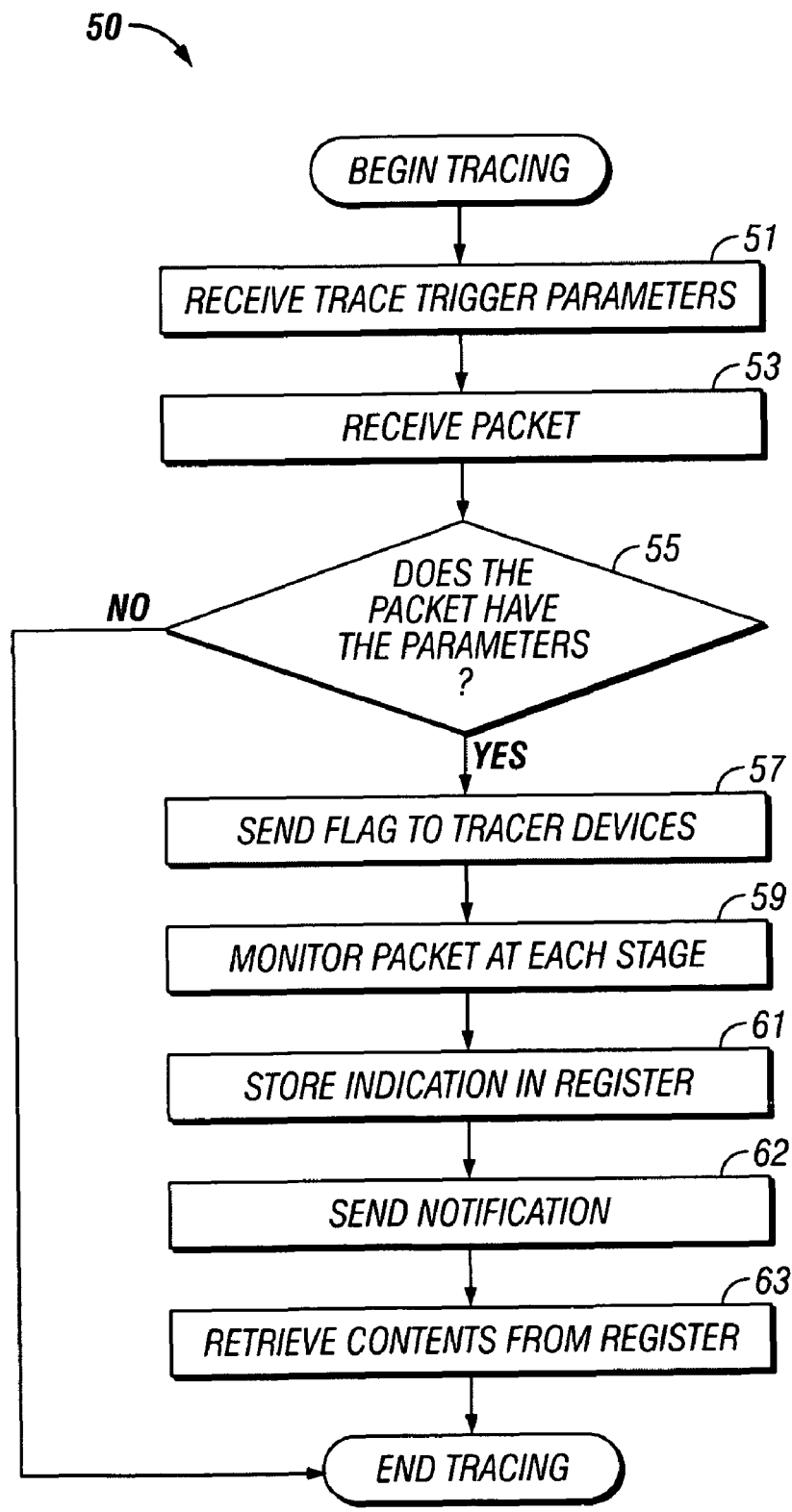
FIG. 2 is a flowchart of a process for packet tracing.

Referring to FIG. 2, process 50 is an exemplary process for tracing packets within packet processor 18. Process 50 receives (51) trace trigger parameters. Application 30 sends the trace trigger parameters to trace trigger 14. The trace trigger parameters are used to designate which packets will be traced through the packet processor 18. Trace trigger parameters include characteristics of a packet that is designated to be traced. For example, trace trigger parameters may be specified to trace the packet with Internet Protocol (IP) source address 192.168.*.*. Other examples of a trace trigger parameters include IP destination address, packet length, packet protocol and so forth. The trace trigger parameters may be found anywhere within a packet, for example, in a header of the packet.

Process 50 receives (53) a packet. For example, the packet is received by processor 18 and by trace trigger 14 from a network. Process determines (55) if the packet has the trace trigger parameters. For example, trace trigger 14 analyzes the packet and determines if the packet contains the trace trigger parameter, for example, an IP source address in the header. If the packet does contain the trace trigger parameters, process 50 sends (57) a trigger signal to the tracer devices 22a-22c indicating that the packet will be traced. For example, the trigger signal is sent to trace device 22a. After processing stage 26a completes processing of the packet, the trace signal is sent to tracer device 22b and after processing stage 26b completes processing of the packet, the tracer signal is sent to tracer device 22c.

Process 50 monitors (59) a packet has at each processing stage. For example, each tracer device 22a-22c monitors its corresponding processing stage 26a-26c to determine if the packet completes the processing stage, what modifications were made to the packet, what processing was performed and so forth.

When the packet passes through a processing stage, process 50 stores (61) an indication that the packet is through the processing stage, what modifications were made at that processing stage, what processing was performed and so forth. For example, tracer device 22a-22d stores the indication at its register 24a-24c.

Process 50 sends (62) a notification to application 30 that the processing is complete. Process 50 sends (63) the indication from each register 24a-24c to application 30.

Packet tracing system 10 aids in device drive and protocol stack development. Without packet tracing system 10, developers would depend on a packet processor's external behavior to determine the status of the packet processing within a silicon device. Sometimes special probes would be used, which can connect to a logic analyzer externally. Such solutions are expensive and time-consuming to set-up.

Packet tracing system 10 is a cost effective way to monitor and record the packet processing in real-time. Since trace indications are stored in registers, reading and analyzing the data is not time critical. Designating the trace trigger parameters enables a user to pinpoint a packet out of a large number of packets. Packet tracing system 10 may also be used during silicon debugging or circuit emulations.

Figure 3:
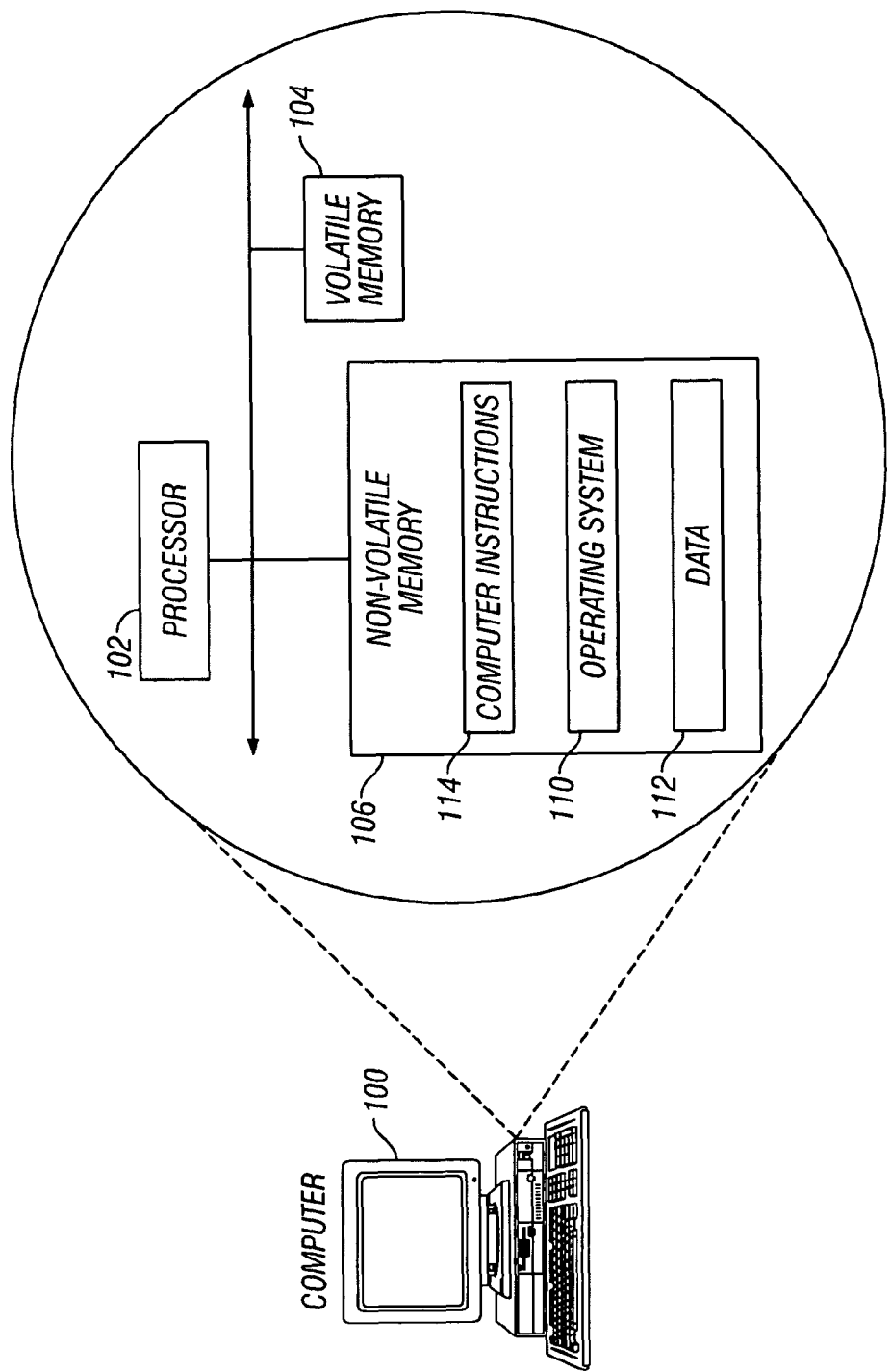
FIG. 3 is a block diagram of a computer system on which the process of FIG. 2 may be implemented.

FIG. 3 shows a computer 100 for using process 50. Computer 100 includes a processor 102, a volatile memory 104, and a non-volatile memory 106 (e.g., hard disk). Non-volatile memory 106 stores operating system 110, data storage 112, and computer instructions 114 which are executed by processor 102 out of volatile memory 104 to perform process 50.

Process 50 is not limited to use with the hardware and software of FIG. 3; the process may find applicability in any computing or processing environment and with any type of machine that is capable of running a computer program. Process 50 may be implemented in hardware, software, or a combination of the two. For example, process 50 may be implemented in a circuit that includes one or a combination of a processor, a memory, programmable logic and logic gates. Process 50 may be implemented in computer programs executed on programmable computers/machines that each includes a processor, a storage medium or other article of manufacture that is readable by the processor including volatile and non-volatile memory and/or storage elements), at least one input device, and one or more output devices. Program code may be applied to data entered using an input device to perform process 50 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device e.g., CD-ROM, hard disk, or magnetic diskette that is readable by a general or special purpose programmable computer for configuring and operating the computer when the storage medium or device is read by the computer to perform process 50. Process 50 may also be implemented as one or more machine-readable storage media, configured with a computer program(s), where upon execution, instructions in the computer program(s cause a computer to operate in accordance with process 50.

Figure 4:
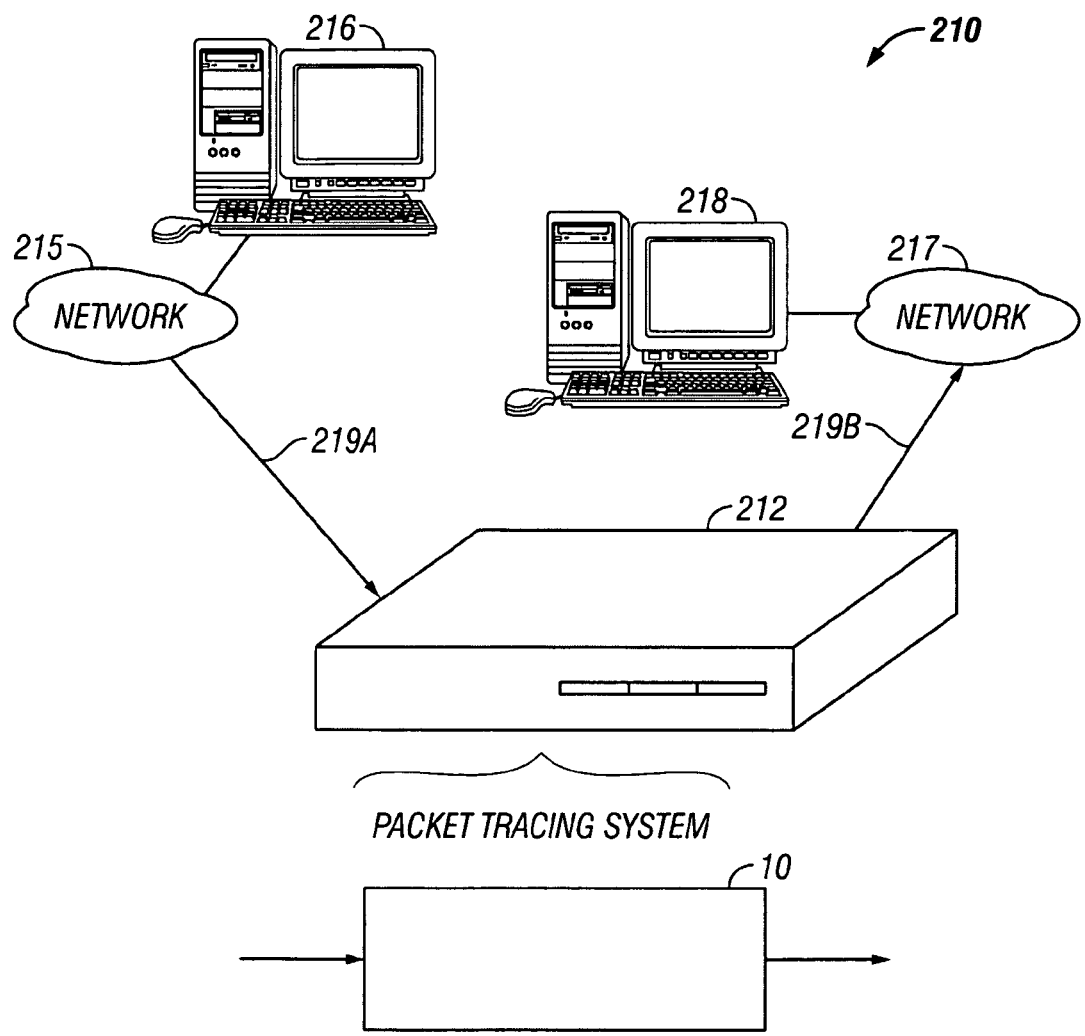
FIG. 4 is a diagram of a router that includes a packet tracing system.

Referring to FIG. 4, packet tracing system 10 may be used in a variety of applications, for example, a network system 210. Network system 210 includes a router 212 that has a packet tracing system 10, a first network 215 (e.g., wide-area network (WAN), local-area network (LAN) and so forth) having a client 216, and a second network 217 having a client 218. Router 212, which is connected to first network 215 by line 219a and connected to network 217 by line 219b, allows client 216 and client 218 to communicate with each other. Typically, first network 215 is a different type of network than second network 217, for example, the first network is a WAN and the second network is a LAN. Router 212 performs the required processing to ensure the data transfer is compatible for each network. Client 218 and client 216 may each monitor packet tracing system 10 remotely to determine the status of packets being processed within the processor.

The process described herein is not limited to the specific embodiments described herein. For example, the process described herein is not limited to the specific processing order of FIG. 2. Rather, the blocks of FIG. 2 may be re-ordered, as necessary, to achieve the results set forth above. In other examples, the number of trace device-processing stage components are not limited to the number described herein.

In some examples, the trigger signal may be a flag.

In some examples, the trigger signal is sent to each tracer device 22a-22c simultaneously. Each trace device 22a-22c delays tracing the packet to correspond to the arrival of the packet at the tracer device's respective processing stage.

In some examples, the trace trigger may be configurable for a "one time trace mode" or an "auto repeat mode". In the "auto repeat mode", a counter may be used to indicate the number of times packets were traced.

In other examples, the tracer device is positioned within its corresponding processing stage. In other examples, the trace trigger is positioned within the processor.

Other embodiments not described herein are also within the scope of the following claims.

What is claimed is:

1. A method of packet tracing as a packet is passed along a plurality of processing stages within a packet processor, the method comprising:
   receiving, at a first tracer device of a plurality of tracer devices each coupled to a corresponding one of the processing stages, a signal to monitor functions performed on the packet by a first associated processing stage within the packet processor;
   in response to the receiving, monitoring, by the first tracer device, the functions performed on the packet by the first processing stage, the functions including one or more of parsing the packet, performing address look-up, auto-learning, forwarding port determination, accessing control lists, editing, or determining IP routing,
   storing, at the first tracer device, an indication denoting the functions performed on the packet by the first processing stage;
   passing the signal from the first tracer device to a next tracer device when the packet processing passes from the first processing stage to a next processing stage; and
   sending the indication to an application configured to monitor the packet.

2. The method of claim 1, further comprising storing the indication in a register.

3. The method of claim 1, wherein the indication denotes one or more of whether the packet has passed through the first processing stage, what functions were performed on the packet, and how the packet was modified.

4. The method of claim 2, wherein the application is selected from a group consisting of a central processing unit, a device driver, a protocol stack, debugging software and a software application.

5. The method of claim 1, further comprising:
   checking the packet for a trigger parameter indicating that the functions performed on the packet by the first processing stage are to be monitored; and
   upon determining a presence of the trigger parameter in the packet, sending the signal to monitor the functions performed on the packet.

6. The method of claim 5, wherein the trigger parameter is a parameter from a group of parameters consisting of an Internet Protocol (IP) source address, IP destination address, packet length, and packet protocol.

7. An apparatus comprising:
   a plurality of processing stages each configured to:
      receive a packet, and
      perform one or more functions on the packet; and a plurality of tracer devices each operatively coupled to one of the processing stages and each configured to perform operations comprising:
  receiving a signal to monitor the one or more functions performed on the packet by the one of the processing stages, and
  in response to the receiving, monitoring the functions performed on the packet by the one of the processing stages, the monitoring comprising one or more of:
    determining the functions performed on the packet by the one of the processing stages,
    determining one or more methods in which the functions are performed on the packet, and
    determining modifications to the packet as a result of the one or more functions,
  wherein the operations performed by each of the plurality of tracer devices further comprise:
    receiving an indication denoting the monitoring, the indication produced when the one of the processing stages completes performing the functions;
    storing the indication; and
    sending the indication to an application configured to monitor the packet.

8. The apparatus of claim 7, wherein the tracer device includes a register to store the indication.

9. The apparatus of claim 7, wherein the application is selected from a group consisting of a central processing unit, a device driver, a protocol stack, debugging software and a software application.

10. The apparatus of claim 7, further comprising a trace trigger configured to perform operations comprising:
  checking the packet for a trigger parameter indicating that the plurality of functions performed on the packet by the processing stages are to be monitored; and
  upon determining a presence of the trigger parameter in the packet, sending the signal to the tracer devices to monitor the functions performed on the packet.

11. The apparatus of claim 10, wherein the trigger parameter is a parameter from a group of parameters consisting of an Internet Protocol (IP) source address, IP destination address, packet length, and packet protocol.

12. An article comprising a machine-readable medium that stores executable instructions for packet tracing, the instructions causing a machine to:
  receive a signal, at a tracer device of a plurality of tracer devices coupled to a corresponding plurality of processing stages within a packet processor, to monitor functions performed on a packet by an associated stage of the plurality of processing stages;
  in response to the receiving, monitor, at a tracer device, the functions performed on the packet, wherein an indication denoting the function is produced when the associated processing stage completes performing the functions;
  store the indication at the tracer device;
  passing the signal from the tracer device to a next tracer device when processing of the packet passes to a next processing state; and
  send the indication to an application configured to monitor the packet.

13. The article of claim 12, wherein instructions causing a machine to store the indication comprises storing the indication in a register.

14. The article of claim 12, wherein the indication denotes one or more of whether the packet has passed through the associated processing stage, what functions were performed on the packet, and how the packet was modified.

15. The article of claim 12, wherein the application is selected from a group consisting of a central processing unit, a device driver, a protocol stack, debugging software and a software application.

16. The article of claim 12, further comprising instructions causing a machine to:
  check the packet for a trigger parameter indicating that the functions performed on the packet by the associated processing stage are to be monitored; and
  upon determining a presence of the trigger parameter in the packet, send the signal to monitor the functions performed on the packet.

17. The article of claim 16, wherein the trigger parameter is a parameter from a group of parameters consisting of an Internet Protocol (IP) source address, IP destination address, packet length, and packet protocol.

18. A network processing system for processing a plurality of packets, comprising:
  a triggering device to receive a parameter indicating if one or more packets are to be traced; and
  a processor operatively coupled to the triggering device, the processor including:
    a plurality of processing stages, and
    a corresponding plurality of tracer devices operatively coupled to the plurality of processing stages, each tracer device to receive a signal from the triggering device to trace a packet through a corresponding processing stage upon the triggering device receiving the parameter indicating that the packet is to be traced, each tracer device configured to trace the packet by monitoring functions performed on the packet by the corresponding processing stage.

19. The router of claim 18, wherein each tracer device comprises a register for storing an indication of the processing performed at the corresponding processing stage.

20. The router of claim 19, wherein a client is connected to the first network, the client reads the register.

21. The method of claim 1, wherein the functions performed by the first processing stage on the packet include one or more of parsing the packet, performing address look-up, auto-learning, determining a forwarding port, accessing control lists, editing, and determining Internet Protocol routing.

22. The method of claim 5, wherein checking the packet for the trigger parameter includes performing a masked comparison on portions of a header of the packet.

23. The apparatus of claim 7, wherein the functions performed by the one of the processing stages on the packet include one or more of parsing the packet, performing address look-up, auto-learning, determining a forwarding port, accessing control lists, editing, and determining Internet Protocol routing.

24. The apparatus of claim 10, wherein the trace trigger to check the packet for the trigger parameter is further configured to perform a masked comparison on portions of a header of the packet.

25. The article of claim 12, wherein the functions performed by the associated processing stage on the packet include one or more of parsing the packet, performing address look-up, auto-learning, determining a forwarding port, accessing control lists, editing, and determining Internet Protocol routing.

26. The article of claim 16, wherein the instructions causing the machine to check the packet for the trigger parameter includes instructions to perform a masked comparison on portions of a header of the packet.

27. The apparatus of claim 18, wherein the tracer device configured to trace the packet by monitoring functions performed on the packet by the corresponding processing stage is further configured to perform one or more of:

determining the functions performed on the packet by the processing stage, determining a manner in which the functions are performed on the packet, and determining modifications to the packet as a result of the functions.

\* \* \* \* \*